Patented Oct. 9, 1945

2,386,272

UNITED STATES PATENT OFFICE 2,386,272

PROCESS FOR THE STABILIZATION OF UNSATURATED HYDROCARBONS

Walter A. Schulze, Bartlesville, Okla., assignor to Phillips Petroleum Company, a corporation of Delaware No Drawing. Application February 10, 1942, Serial No. 430,279

6 Claims. (Cl. 260—666.5)

This invention relates to the treatment of unsaturated hydrocarbons which are susceptible to the catalytic effects of certain metals and metal salts which greatly alter the spontaneous or induced reactions of said hydrocarbons. More specifically this invention relates to a method of treating diolefins, vinyl compounds and the like, said method further including means of controlling the concentration of certain metals and/or metal compounds in said hydrocarbons to control the catalytic effects thereof.

Recently certain diolefins and vinyl compounds such as butadiene, isoprene, piperylene, and the like have, by virtue of their reactivity, become extremely useful in concentrated form for controlled and/or catalytically induced polymerization by various methods. Some of the polymers produced by these methods possess properties approximating those of natural rubber. Other polymers have special desirable properties not formerly available in natural products, thus creating valuable uses for the new materials. These newly-available uses make the diolefins and vinyl compounds increasingly important as raw materials, and have initiated various commercial manufacturing processes for said raw materials.

The methods developed for utilizing these highly unsaturated compounds ordinarily require that they be supplied in a high degree of purity and be substantially free of preformed polymers and polymerization inhibitors at the time of utilization. Preformed polymers and non-volatile residues present difficulties in processing and represent a loss of valuable raw material, while polymerization inhibitors obviously interfere with the conversion of the raw material in the various manufacturing steps. Thus, the chemical characteristics of the diolefins and vinyl compounds as well as the nature of the ultimate uses make it necessary to produce same in a state of high purity and uniform reactivity. Of particular importance is the control of the concentration of dissolved metals and metal salts which are capable of extensive catalytic effects.

The stabilization of aliphatic diolefin concentrates and the like during production, storage, and shipment against premature polymerization may comprise the use of various antioxidants or other specific additives capable of suppressing peroxide and/or polymer formation. However, in the presence of dissolved metal compounds, the effect of such additives may be overbalanced and the additives themselves destroyed by the catalytic effect of the metal compounds. In order to impart adequate stability under these circumstances, the metal compounds must be removed or deactivated prior to or by means of the stabilizing or purifying treatment.

It is an object of this invention to provide a process for the substantially complete removal of metal compounds from diolefin concentrates.

It is a further object of this invention to provide a process for the regulation of the concentration of metal salts in diolefin concentrates at any stage in the production and processing of said concentrates.

It is a still further object of this invention to provide reagents for the purification of diolefin concentrates containing traces of metal compounds by means of which metal compounds are removed or the concentration thereof is reduced to desirable low values. Said reagents may or may not have the properties of inhibitors in addition to their specific reaction with metal compounds. These and other objects and advantages will be evident from the following disclosure.

The occurrence of metal compounds in diolefin concentrates may be due to a number of factors among which may be the tendency of diolefins and unsaturated hydrocarbons to form metal salt complexes. Traces of metal salts may thus be retained from contact with metals and metal alloys as well as with treating solutions, and reagents of various kinds. In particular, when segregated and purified with cuprous or other metal salt reagents, the unsaturated hydrocarbons may retain traces of dissolved metal salts. Copper salts and others such as manganese, chromium, zinc, nickel, tin, cadmium, and lead salts may profoundly affect the stability and processing characterictics of a diolefin concentrate employed in emulsion and other types of polymerization, and may even be added to diolefins, vinyl compounds, and the like to inhibit premature polymerization.

The methods employed for producing diolefins are generally of such a nature that impurities such as sulfur, oxygen and nitrogen compounds are substantially completely removed. For example, the high temperature thermal or catalytic dehydrogenation processes employed to produce butadiene hydrocarbons effectively destroy and remove sulfur and other impurities. Therefore, although the exact nature of the metal salts retained by diolefinic hydrocarbons is not always known, hydrocarbon complex formation is usually indicated because of the substantially complete absence of compounds such as mercaptans, naphthenic acids, cresols and the like ordinarily responsible for metal salt formation in hydrocarbons such as gasoline and kerosene.

I have now discovered that greatly improved results may be obtained by the purification of diolefin or other highly unsaturated hydrocarbon concentrates prior to utilization when said concentrates contain metal compounds. The purification procedure which is found particularly effective comprises the treatment of the hydrocarbon liquids with certain reagents which convert the metal compounds therein to oil-insoluble form or to substantially deactivated form. Deactivation may in some instances be accomplished by reduction of the metal ion concentration to extremely low and non-harmful levels. The diolefinic hydrocarbons treated by the process may or may not receive an after-treatment to remove any excess of said reagents, depending upon the chemical nature and anti-oxidant properties of said reagents.

I have noted that the dissolved copper salts present in a diolefinic hydrocarbon liquid for any reason may be removed or satisfactorily reduced in concentration to levels of about one part per million or less by the addition of certain alkyl mercaptans. These mercaptans of general formula R—SH, where R represents an alkyl group may be considered organic derivatives of hydrogen sulfide and form copper salts by reaction of the metal with the active sulfhydryl grouping. The oil-solubility of the copper mercaptides varies with the length of the carbon chain of the alkyl group. Thus, as copper sulfide is the least soluble inorganic copper salt, copper methyl mercaptide is the least soluble mercaptide. Copper ethyl mercaptide is appreciably more soluble, although its actual solubility figure is extremely low. The propyl, butyl and amyl mercaptides are much more soluble, ranging up to values of the order of 0.1 to 1 per cent or more by weight of the light hydrocarbons.

When the copper content of a hydrocarbon liquid exceeds the solubility of an alkyl copper mercaptide, the addition of the corresponding mercaptan results in a reduction of the copper content, with the maximum reduction resulting from the addition of methyl mercaptan. In treating diolefinic liquids to remove dissolved copper, ethyl mercaptan produces a reduction to a value of about 0.1 part per million, while methyl mercaptan produces a still lower value not detectable with extremely sensitive analytical methods. While less complete removal results with ethyl mercaptan, any catalytic effect attributable to the dissolved copper ethyl mercaptide is apparently often beneficial.

The methyl and ethyl mercaptans have the added advantage of being relatively strong anti-oxidants in addition to the copper removal function. Therefore, if an excess of reagent is used in adjusting the copper concentration to non-harmful values, added protection against oxidation is afforded. In processing steps such as certain forms of emulsion polymerization, these mercaptans are not harmful and are ordinarily converted to inactive salts.

When hydrogen sulfide is employed instead of methyl or ethyl mercaptan, the removal of copper through formation of copper sulfide is substantially complete. However, hydrogen sulfide is less convenient to use in the process because of its toxicity and corrosive qualities. Also hydrogen sulfide may be oxidized to form free sulfur which in some cases may not be a desirable impurity in the hydrocarbon liquid. When an after-treatment is used subsequent to the removal of copper, both of the mercaptans and hydrogen sulfide may be substantially completely removed by an alkaline wash.

In addition to the above-named reagents with active sulfhydryl groupings, certain other more complex organic compounds form copper salts which are substantially insoluble in hydrocarbon liquids and may be employed for the process of this invention to produce copper concentrations of about one part per million or less. These reagents are characterized by sulfhydryl groupings in which the hydrogen may be replaced by a metal, although the reactivity of the said hydrogen may be influenced or even due to the presence of adjacent polyvalent groupings. Thus, in several cases the sulfhydryl group is dependent on a tautomeric rearrangement or enolization.

The preferred reagents in this group are (1) diphenylthiocarbazone, commonly called dithizone, (2) diethyldithiocarbamic acid or an alkali metal salt thereof, (3) thioglycollic acid -β-aminonaphthalide (thionalide) and (4) 2-mercaptobenzothiazole. The formulas of these reagents are as follows:

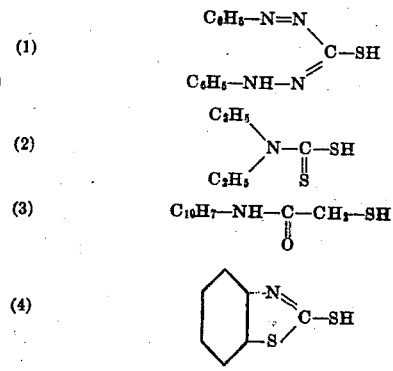

Since all reagents in this group react with copper through the sulfhydryl group, the reagents may be used in aqueous solutions, preferably on the alkaline side in which case the hydrogen may be replaced by an alkali metal ion. The copper salt formed when the hydrocarbon liquid is contacted therewith may be retained by and withdrawn in the aqueous phase. In some cases, the reagent may be added directly to the hydrocarbon liquid when the solubility is favorable. If desired any excess reagent may then be removed subsequently by means of an alkaline wash. When direct addition of a reagent is desired, a solution in a miscible solvent such as benzene is often employed.

To illustrate the results obtained in the stabilization or purification of diolefinic liquids, the following exemplary applications are provided.

EXAMPLE I

A butadiene concentrate which had been treated over a cuprous chloride reagent retained traces of dissolved copper salts equivalent to about 1 part per million of copper. Two portions of this material were treated with 0.01 weight per cent of methyl and ethyl mercaptan respectively, while a third portion was stored untreated. The results of the treatment are shown below in Table I following storage in steel containers.

Table I

| Number | Sample | Copper content | Polymerization characteristics (12 weeks) |
|---|---|---|---|
| | | P. P. M. | |
| 1 | Untreated butadiene | 1 | Poor. |
| 2 | Butadiene+0.01% $CH_3$—SH | <0.1 | Good. |
| 3 | Butadiene+0.01% $C_2H_5$—SH | 0.1 | Do. |

At the end of the storage period, small amounts of the excess mercaptan reagents remained in the hydrocarbon liquid, but did not adversely affect the processing of the material.

In order to demonstrate further the beneficial results obtained by adjustment of the concentration of copper compounds in aliphatic diolefin concentrates, a portion of a completely unsaturated C₅ hydrocarbon liquid containing over 95 per cent of diolefins was treated with sufficient copper oleate to produce a copper content of about 100 parts per million. This liquid then showed an increased tendency toward oxygen absorption, and the polymerization characteristics were impaired. Treatment of this material according to the present invention produced the effects listed in the following example.

EXAMPLE II

The C₅ diolefin liquid containing both isoprene and piperylene and small amounts of C₅ olefins after the addition of 100 parts per million of copper was divided into a number of sample portions. The portions were then treated respectively with methyl and ethyl mercaptan and with slightly alkaline aqueous solutions of the above-described complex reagents exhibiting an active metal salt-forming sulfhydryl group. The results are listed in Table II, below.

Table II

| Number | Sample | Reagent | Copper content P.P.M. | Polymerization characteristics |
|---|---|---|---|---|
| 1 | Untreated C₅ diolefin | None | 0 | Good. |
| 2 | Sample (1)—100 P. P. M. copper | do | 100 | Very poor. |
| 3 | Sample (2) | Dithizone | <0.1 | Good. |
| 4 | do | Sodium diethyl-dithiocarbamate | 0.1 | Do. |
| 5 | do | Thionalide | 0.1 | Do. |
| 6 | do | Sodium mercapto-benzothiazole | 0.1 | Do. |
| 7 | do | Methyl mercaptan | <0.1 | Do. |
| 8 | do | Ethyl mercaptan | 0.1 | Do. |

While the process of the present invention may be directed primarily to the reduction of the copper content of diolefin concentrates, an added advantage is the capacity of the preferred reagents to form salts with other heavy metals apparently through the same mechanism proposed for reaction with copper. This factor enables the co-precipitation and removal in many instances of traces of other heavy metals present in said diolefin concentrates. The following tabulation exemplifies a number of reactions possible with the aforesaid reagents, and illustrates the multiple effects resulting from the proper choice of reagents for stabilizing diolefinic liquids containing heavy metals.

Table III

| Metal | Reagents operative (listed in order of reduction of metal content) |
|---|---|
| Lead | Methyl mercaptan; dithizone; thionalide. |
| Manganese | Dithizone. |
| Zinc | Do. |
| Cadmium | Methyl mercaptan; mercaptobenzothiazole (ammonium salt). |
| Nickel | Thionalide, dithizone. |
| Chromium | Dithizone. |
| Tin | Do. |

The preferred reagents for the process of this invention are also characterized by the ease with which any excess directly or indirectly added to a diolefinic liquid may be removed. For this purpose, an alkaline aqueous wash performed in conventional equipment may be utilized. This consideration is particularly pertinent in the case of methyl and ethyl mercaptans and hydrogen sulfide which are miscible with the hydrocarbon liquids and may be added in excess to take advantage of the anti-oxidant function of these materials.

While I have specifically disclosed my invention with regard to its application to butadiene hydrocarbons, it will be obvious that the process disclosed is applicable to other unsaturated hydrocarbons and related compounds in whose production and processing the problem of heavy metal salt contamination or inhibition is encountered. Also, while the reagents described herein have been rather specifically identified, the method of selection and the requisite chemical and physical characteristics exemplified render this feature of the invention subject to modification and extension within the scope of the disclosure. Therefore, no limitations are to be inferred except as defined in the appended claims.

I claim:

1. The process of substantially completely removing dissolved copper compounds in the form of cuprous salt-unsaturated hydrocarbon complexes from substantially pure liquid butadiene which comprises contacting said butadiene in liquid form with methyl mercaptan and thereby precipitating substantially all of the copper contained in said copper compounds as insoluble copper methyl mercaptide, and separating said copper methyl mercaptide from the resulting butadiene.

2. The process of substantially completely removing dissolved copper compounds in the form of cuprous salt-unsaturated hydrocarbon complexes from substantially pure liquid butadiene which comprises contacting said butadiene in liquid form with a reagent consisting of a material selected from the group consisting of hydrogen sulfide, methyl mercaptan and ethyl mercaptan and thereby precipitating substantially all of the copper contained in said copper compounds as insoluble copper salts, and separating said insoluble copper salts from the resulting butadiene.

3. The process of substantially completely removing dissolved copper compounds in the form of cuprous salt-unsaturated hydrocarbon complexes from liquid low-boiling aliphatic diolefin hydrocarbon concentrates consisting essentially of low-boiling aliphatic diolefin hydrocarbon having a conjugated system of double bonds to a concentration of not over 0.1 part per million which comprises contacting said concentrate in liquid form with a reagent consisting of a material selected from the group consisting of hydrogen sulfide, methyl mercaptan and ethyl mercaptan and thereby precipitating substantially all of the copper contained in said copper compounds as insoluble copper salts, and separating said insoluble copper salts from the resulting diolefin concentrate.

4. The process of substantially completely removing dissolved copper compounds in the form of cuprous salt-unsaturated hydrocarbon complexes from liquid low-boiling aliphatic diolefin hydrocarbon concentrates consisting essentially of low-boiling aliphatic diolefin hydrocarbon having a conjugated system of double bonds to a concentration of not over 0.1 part per million and simultaneously protecting said concentrate against oxidation which comprises contacting said concentrate in liquid form with a reagent consisting of a material selected from the group consisting of hydrogen sulfide, methyl mercaptan and ethyl mercaptan and thereby precipitating substantially all of the copper contained in said copper compounds as insoluble copper salts, employing in said treatment such an excess of said reagent over the copper compounds contained in said concentrate as to protect said concentrate against oxidation, separating said insoluble copper salts from the resulting diolefin concentrate containing said excess of said reagent, and allowing said excess of said reagent to remain in said diolefin concentrate and function therein as an antioxidant.

5. The process of substantially completely removing dissolved copper compounds in the form of cuprous salt-unsaturated hydrocarbon complexes from liquid low-boiling aliphatic diolefin hydrocarbon concentrates consisting essentially of low-boiling aliphatic diolefin hydrocarbon having a conjugated system of double bonds which comprises contacting said concentrate in liquid form with hydrogen sulfide and thereby precipitating substantially all of the copper contained in said copper compounds as insoluble copper sulfide, and removing said copper sulfide from the resulting diolefin concentrate.

6. The process of substantially completely removing dissolved copper compounds in the form of cuprous salt-unsaturated hydrocarbon complexes from substantially pure liquid butadiene to a concentration of not over 0.1 part per million and simultaneously protecting said butadiene against oxidation which comprises contacting said butadiene in liquid form with methyl mercaptan and thereby precipitating substantially all of the copper contained in said copper compounds as insoluble copper methyl mercaptide, employing in said treatment such as excess of methyl mercaptan over the copper contained in said butadiene as to protect said concentrate against oxidation, separating said insoluble copper methyl mercaptide from the resulting butadiene containing said excess of said methyl mercaptan, and allowing said excess of said methyl mercaptan to remain in said butadiene and function therein as an antioxidant.

WALTER A. SCHULZE.